No. 718,784. PATENTED JAN. 20, 1903.
C. B. McKAY.
SWING.
APPLICATION FILED MAR. 13, 1902.
NO MODEL. 3 SHEETS—SHEET 1.

WITNESSES:
Edward Thorpe
C. R. Ferguson

INVENTOR
Charles B. McKay
BY
Munn
ATTORNEYS

No. 718,784. PATENTED JAN. 20, 1903.
C. B. McKAY.
SWING.
APPLICATION FILED MAR. 13, 1902.
NO MODEL. 3 SHEETS—SHEET 2.
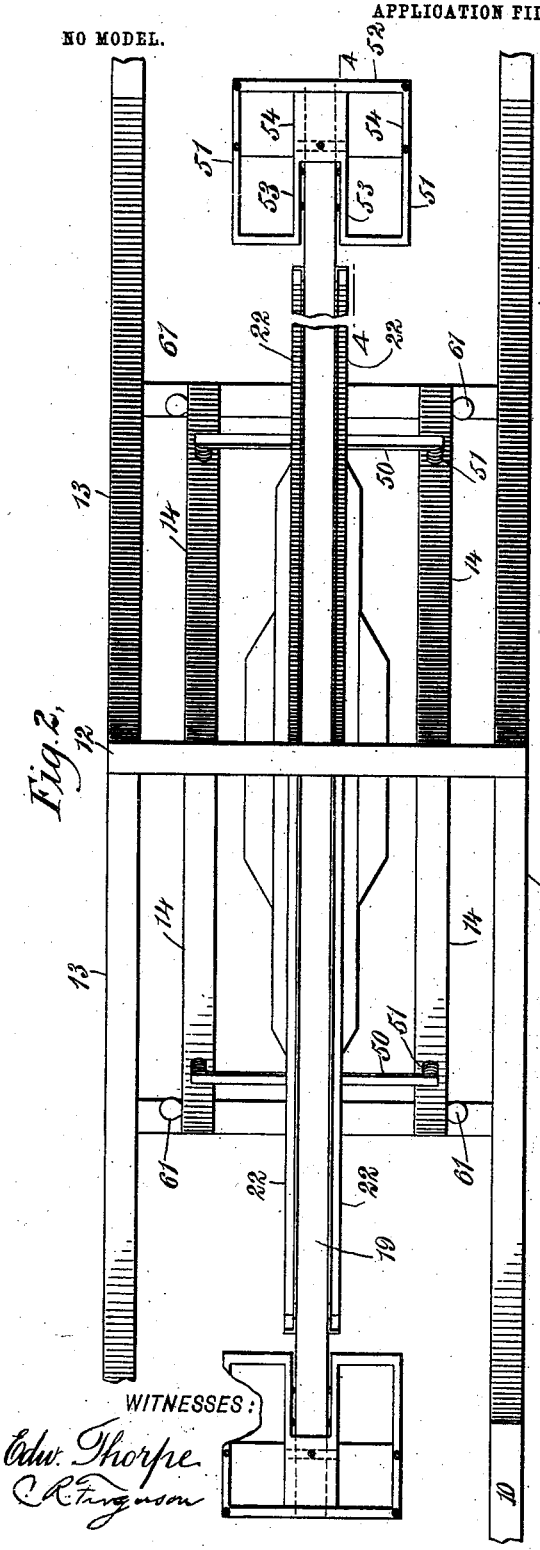
WITNESSES:
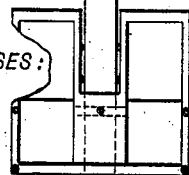
INVENTOR
Charles B. McKay
BY
ATTORNEYS No. 718,784.

PATENTED JAN. 20, 1903.

C. B. McKAY.
SWING.
APPLICATION FILED MAR. 13, 1902.

NO MODEL.

3 SHEETS—SHEET 3.

WITNESSES:
Edw. Thorpe
C. R. Ferguson

INVENTOR
Charles B. McKay
BY
Munn
ATTORNEYS

UNITED STATES PATENT OFFICE.

CHARLES B. McKAY, OF NEW YORK, N. Y.

SWING.

SPECIFICATION forming part of Letters Patent No. 718,784, dated January 20, 1903.

Application filed March 13, 1902. Serial No. 98,013. (No model.)

*To all whom it may concern:*

Be it known that I, CHARLES B. MCKAY, a citizen of the United States, and a resident of the city of New York, borough of the Bronx, in the county and State of New York, have invented a new and Improved Swing, of which the following is a full, clear, and exact description.

This invention relates to improvements in pleasure devices in the form of teetering swings; and the object is to provide a device of this character having a single swinging beam with cars or passenger-seats at opposite ends so connected as to at all times maintain a vertical position; further, to provide in connection with the beam a weight that may be quickly and easily adjusted to cause a balance of the beam when the cars at opposite ends are sustaining different weights, or, in fact, when the car at one end is occupied and the one at the opposite end empty; and a still further object is to provide a simple device for checking the momentum upon the beam approaching or reaching the desired angles.

Other objects will appear in the general description.

I will describe a swing embodying my invention and then point out the novel features in the appended claims.

Reference is to be had to the accompanying drawings, forming a part of this specification, in which similar characters of reference indicate corresponding parts in all the figures.

Figure 1:
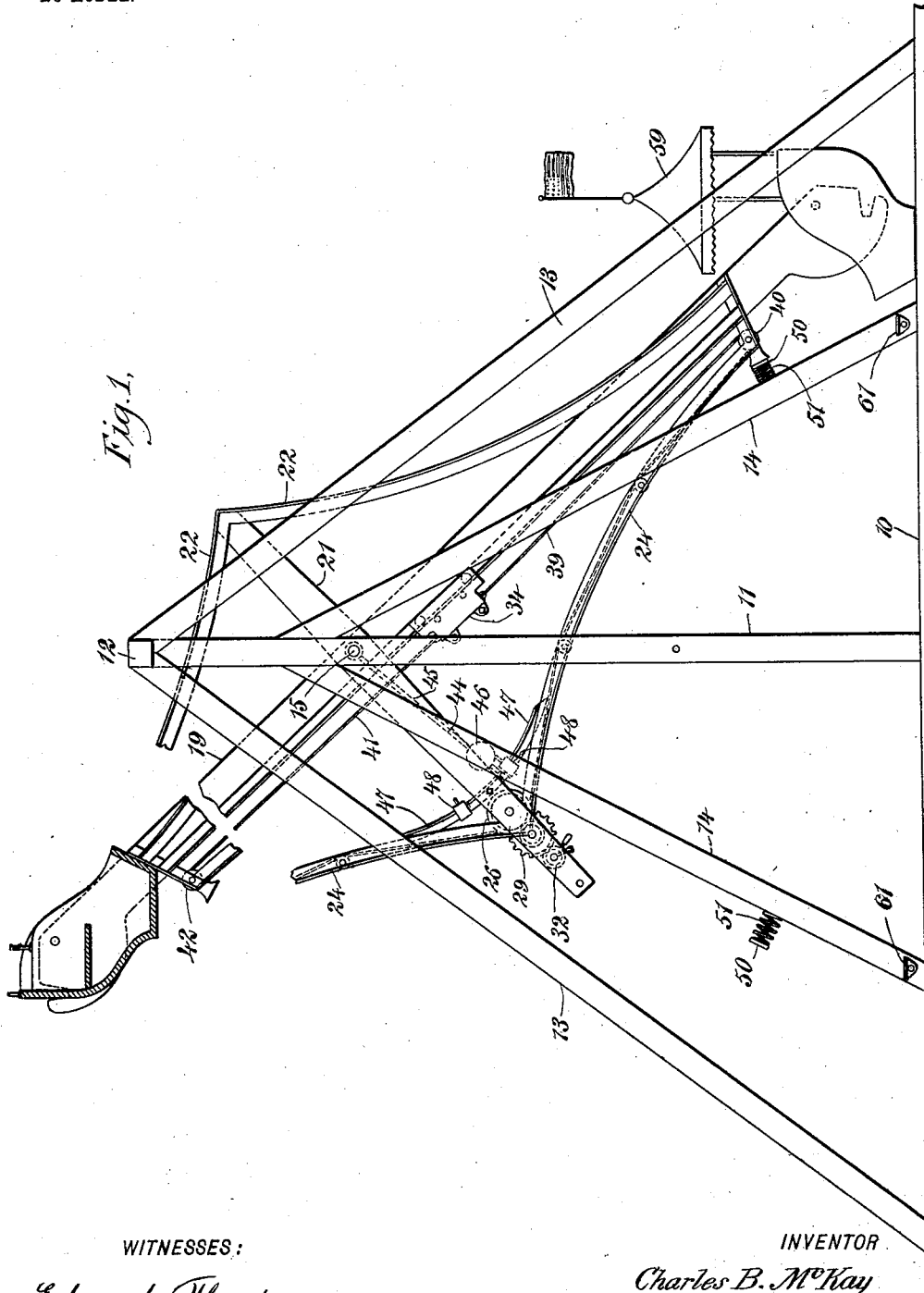
Figure 3:
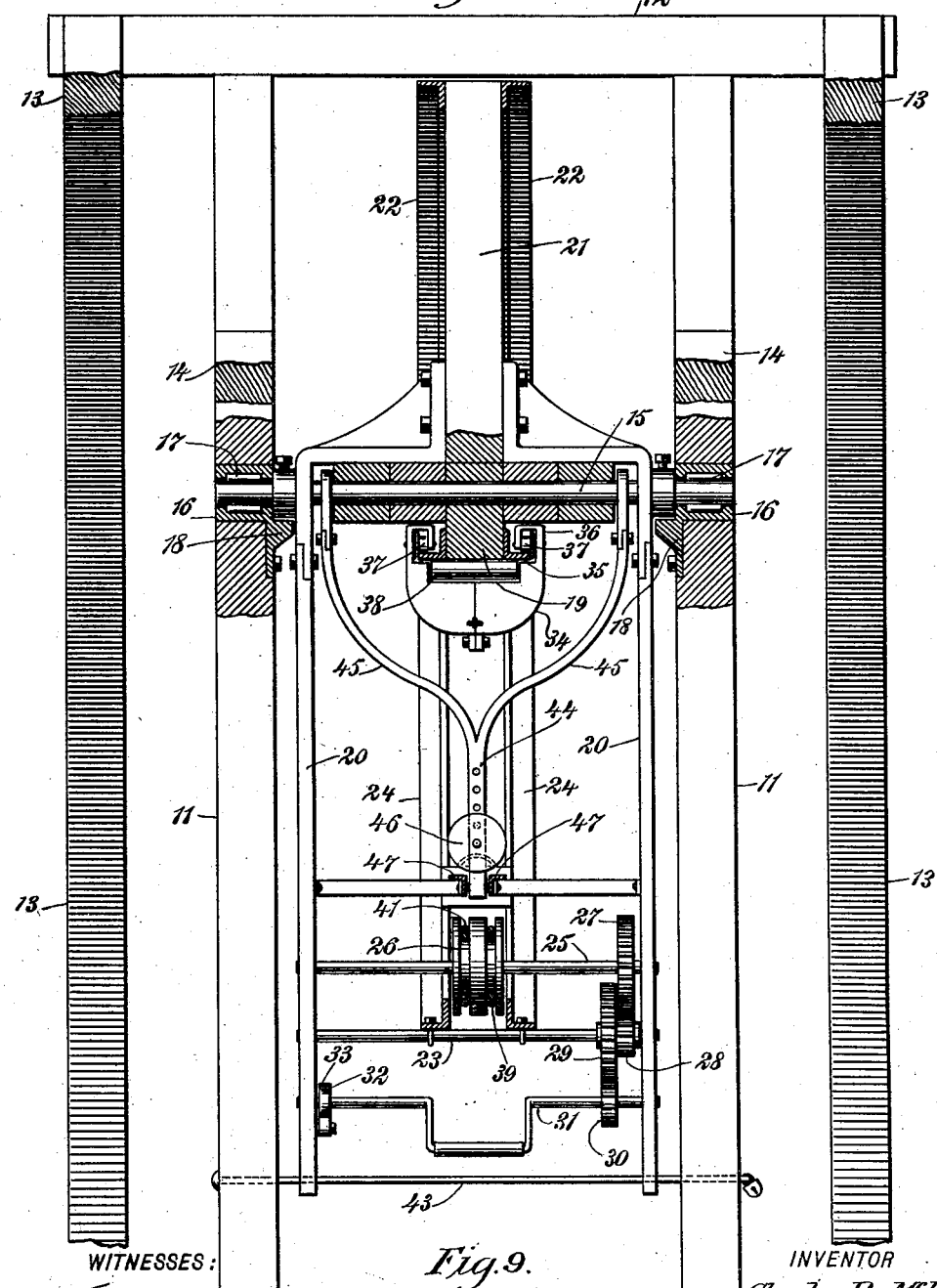
Figure 9:
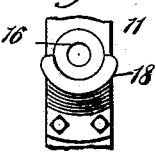

Figure 1 is a side elevation of a swing embodying my invention. Fig. 2 is a plan view of the device. Fig. 3 is a sectional elevation thereof. Fig. 4 is a section on the line 4 4 of Fig. 2. Fig. 5 is a sectional detail showing a weight-shifting mechanism employed and a governor for the beam. Fig. 6 illustrates a means for locking the weight-shifting mechanism. Fig. 7 is a detail plan showing a guide for the governor. Fig. 8 is a section on the line 8 8 of Fig. 5, and Fig. 9 shows one of the bearings for the beam-shaft.

The machine-frame comprises base-rails 10, having uprights 11 at the center, these uprights being connected at the top by a cross-bar 12, and extended in opposite directions from the cross-bar 12 to the base-rails are braces 13, while braces 14 connect the uprights 11 with the base-rails. Having bearings in the uprights 11 is the beam-shaft 15. As here shown, this shaft has its bearings in boxes 16, within which antifriction-rollers 17 are arranged, and at the inner sides of the uprights and connected to the boxes 16 are stirrups 18, designed as protecting devices, or, in other words, to catch the end of the shaft 15 should it be broken near one of the bearing-boxes.

Mounted rigidly on the shaft 15 is the main beam 19, and also rigidly connected to the shaft is a frame for supporting the weight-shifting devices, to be hereinafter described. This frame consists of the side hangers 20 and an upright 21. For convenience in transportation the side members or hangers 20 of the frame may be made in two pieces, as indicated, and held together by bolts when in use. From the upper end of the upright 21 angle-iron braces 22 extend to connection with the beam 19, and from the lower portion of the frame or from a cross-bar 23, mounted therein, extend curved braces 24, which consist of angle-iron and connect at their upper ends with the beam 19. A shaft 25 has bearings in the frame members 20, and on this shaft is fixed a drum 26. Also fixed to the shaft 25 is a gear-wheel 27, meshing with a pinion 28, mounted to rotate on the rod 23, and connected to this pinion is a gear-wheel 29, meshing with a pinion 30 on a crank-shaft 31, having bearings in the members 20 of the frame. On one end of the crank-shaft 31 is a brake-wheel 32, designed to be engaged by a friction-strip 33, attached to one of the frame members 20.

Movable along the beam 19 is a balancing-weight 34. As here shown, this weight consists of two sections suitably bolted together, and it is movable along tracks consisting of angle-irons 35, attached to the beam. The weight has upwardly-extended portions 36, in which rollers 37 are arranged, the said rollers bearing on the tracks, and to reduce friction to a minimum rollers 38 have bearings in the weight and bear against the under side of the beam. From one side of the weight a draw rope or cable 39 extends around a roller 40 near one end of the beam and thence over pulleys on the brace 24 to a connection with the drum 26, and from the other end of the weight 34 a rope or cable 41 extends around a roller 42 at the opposite end of the beam and thence over pulleys on the brace 24 to a connection with the drum 26. These cables 39 and 41 are reversely wound on the drum, and therefore when the drum is rotated to move the weight in one direction its pulling-cable will be wound on the drum while the other cable is given off. By the arrangement of gearing shown a person standing on the ground may readily and quickly adjust the weight to central position or to position at either side of the beam-shaft.

When the device is not in use, it may be locked by means of a rod 43, extended through openings in the uprights 11 and through openings in the frame members 20, as clearly shown in Fig. 3.

Mounted to swing on the shaft 15 is a governing device or a device to prevent undue shock at the end of a movement of the beam, and this device consists of a pendulum-rod 44, having members 45 mounted to swing on the shaft 15. The connection between these members 45 and the shaft may be provided with ball-bearings, if desired, to reduce friction. Adjustable on the pendulum-rod 44 is a weight 46, and the lower end of this rod 44 projects between curved guide-irons 47, which may be made of angle-iron, the ends of which are connected to the braces 24. Adjustable on these guides 47 are stop-blocks 48. These blocks are mounted to slide on the guides and may be held in position as adjusted by means of a U-shaped pin 49, passing through openings in the blocks and through openings in the guides, several of these openings in the guide being shown in Fig. 7. The pendulum-rod is designed to have a movement limited by the space between the blocks 48, and to prevent noise or undue shock I may employ rubber cushions 49ª on the inner sides of the blocks and against which the pendulum-rod may strike.

At the lower ends of the braces 14 are cushion devices for receiving the shock, or rather to relieve the shock of the beam 19. These cushions consist of bars 50, attached, by means of springs 51, to said braces 14.

On each end of the beam 19 is mounted a car, and preferably the car will be arranged with two seats to accommodate two persons. Each car consists of the outer side boards 51, the back 52, and the inner side boards 53, which are spaced apart to permit the ends of the beam to pass between them, and arranged in each compartment is a seat 54. The inner members 53 of the car have pivotal connection 55 with the beam 19. It will be noted that the end of the beam is curved downward and outward, as at 56, and in the upper portion of this curved end is an outwardly-opening slot 57 to receive the lower extended portion of the back 52 when the car is in its uppermost position, thus preventing any possible tipping of the car either rearward or backward. To reduce friction between the car and the beam and also to prevent any lateral swinging motion of the car relatively to the beam, rollers 58 are carried by the inner side members of the car and are designed to engage with the beam 19. The cars are arranged facing each other, and each car will be provided with a suitable canopy 59.

When the weight 34 is moved to its adjusted position, the drum 26 may be locked by any suitable means. I have here shown the drum as provided with a series of perforations 60, in any one of which a pin may be inserted, the said pin passing through an opening in one of the braces 24.

For convenience in entering the cars steps 61 are arranged on the lower ends of the braces 14.

In operation when the passengers enter the cars, and should the weights be unequal at the opposite ends of the beam, the attendant will shift the weight 34 by the means hereinbefore described to a point toward the lighter end sufficient to cause a perfect balance between the two ends. Obviously by this arrangement the device may be evenly balanced should there be two persons in one car and one person in the other or should one car be occupied and the other empty. The blocks 48 are to be adjusted on the guides 47 and secured to permit of the desired length of throw of the pendulum-rod. Upon setting the beam in motion of course one car will move upward while the other is moving downward, and when one end reaches its lowermost position or nearly thereto the end of the pendulum-rod will engage with one of the blocks 48, holding said pendulum-rod from further swinging movement; but the movement of the beam will carry the rod or the weight thereon to a point between the shaft 15 and the upper car. This weighted pendulum-rod by engaging with the stop will not only prevent undue shock, as before described, but by being carried with the frame, as just described, it will act somewhat as a motor to start the beam on its opposite swinging motion, and by means of this weighted rod the swinging motion may be kept up for a considerable length of time without exertion on the part of the attendant.

Having thus described my invention, I claim as new and desire to secure by Letters Patent—

1. A swing comprising a frame, a beam mounted to swing in the frame, cars mounted to swing on the ends of the beam, means for limiting the swinging movement of the cars relatively to the beam, a weight shiftable along the beam, and mechanism for shifting the weight, substantially as specified.

2. A swing comprising a frame, a beam mounted to swing in the frame, cars having swinging connection with the ends of the beam, each car having a plurality of seats, means for limiting the swinging movement of the cars on the beam, a weight movable along the beam, and means for moving said weight, substantially as specified.

3. A swing comprising a frame, a shaft supported in the frame, a beam mounted on the shaft, cars mounted to swing on the ends of the beam, a weight movable along the under side of the beam, a drum carried with the movements of the beam, cable connections between opposite ends of the weight and said drum, the said cables being oppositely wound on the drum, gearing for rotating the drum, a pendulum mounted to swing on the shaft, and stops for the pendulum, substantially as specified.

4. A swing comprising a frame, a beam mounted to swing in the frame, the beam being provided at its ends with outwardly and upwardly opening slots, and cars pivotally connected to the ends of the beam and having back portions designed to engage in said slots, substantially as specified.

5. A swing comprising a frame, a beam mounted to swing in the frame, the said beam having outwardly and upwardly opening slots at its ends, cars mounted to swing on the ends of the beam, each car consisting of two compartments between which the end of the beam passes, and antifriction-rollers between the inner side boards of the car and the end of the beam, substantially as specified.

6. A swing comprising a frame, a shaft mounted in said frame, a beam rigidly connected to the shaft, cars carried on the ends of said beam, a frame carried by the shaft, a winding-drum arranged in said frame, a gearing arranged in the frame for rotating the drum, a weight movable along the beam, cables extended from opposite ends of the weight around pulleys near the ends of the beam and thence to the drum, a pendulum-weight mounted to swing on the shaft, guides for said pendulum-weight and carried with the beam, and stops adjustable on said guides, substantially as specified.

7. A swing comprising a frame, a beam mounted to swing in the frame, cars having swinging connection with the ends of the beam, a weight shiftable along the beam, means for shifting the weight, and cushion devices for the beam at the lower portion of the frame and consisting of bars having spring connection with the frame, substantially as specified.

8. A swing comprising a main frame, bearing-boxes in said frame, a shaft having bearings in said boxes, stirrups connected to the bearing-boxes and arranged below the shaft and projecting lengthwise of the shaft, a beam connected to said shaft, and cars on the ends of the beam, substantially as specified.

9. A swing comprising a main frame, a shaft mounted in the frame, a beam attached to said shaft, frame members extended downward from the shaft, brace connections between said frame members and the beam, a pendulum-rod mounted to swing on the shaft, a weight adjustable on said rod, guide-strips attached to the braces and between which the end of said pendulum-rod extends, and stop-blocks adjustable on said guide-strips, substantially as specified.

10. A swing comprising a frame, a beam mounted to swing in the frame, cars carried on the ends of the beam, a weight movable along the beam, mechanism for moving said weight, a swinging weight or pendulum operating to start the beam in its reverse swinging movements, and adjustable stops for said weight or pendulum, substantially as specified.

In testimony whereof I have signed my name to this specification in the presence of two subscribing witnesses.

CHARLES B. McKAY.

Witnesses:
J. HENRY REIHER,
ALEXANDER LEITNER.